United States Patent
Valenti et al.

(10) Patent No.: US 10,339,290 B2
(45) Date of Patent: Jul. 2, 2019

(54) SPOKEN PASS-PHRASE SUITABILITY DETERMINATION

(71) Applicant: NXP B.V., San Jose, CA (US)

(72) Inventors: Giacomo Valenti, Antibes Juan-les-Pins (FR); Adrien Daniel, Antibes (FR); Nicholas Evans, Valbonne (FR)

(73) Assignee: NXP B.V., Eindhoven (NL)

( * ) Notice: Subject to any disclaimer, the term of this patent is extended or adjusted under 35 U.S.C. 154(b) by 27 days.

(21) Appl. No.: 15/685,146

(22) Filed: Aug. 24, 2017

(65) Prior Publication Data

US 2018/0060557 A1  Mar. 1, 2018

(30) Foreign Application Priority Data

Aug. 25, 2016  (EP) .................................... 16290162

(51) Int. Cl.
  *G06F 21/32* (2013.01)
  *G06F 21/46* (2013.01)
  (Continued)

(52) U.S. Cl.
  CPC .............. *G06F 21/32* (2013.01); *G06F 21/46* (2013.01); *G10L 15/06* (2013.01); *G10L 17/24* (2013.01);
  (Continued)

(58) Field of Classification Search
  CPC ........ H04B 5/00; H04M 1/725; H04W 76/02; H04W 84/18; G06F 21/32; G10L 15/08; G10L 17/22; G10L 25/51; G10F 21/46
  (Continued)

(56) References Cited

U.S. PATENT DOCUMENTS

| 7,065,494 B1 * | 6/2006 | Evans .............. G06Q 10/06393 705/7.32 |
| 7,386,448 B1 | 6/2008 | Poss et al. |

(Continued)

OTHER PUBLICATIONS

Larcher, Anthony et al; "Text-dependent speaker verification: Classifiers, databases and RSR2015"; Science Direct, Speech Communication 60; Elsevier; pp. 56-77 (2014).

(Continued)

*Primary Examiner* — Akwasi M Sarpong

(57) ABSTRACT

An apparatus comprising at least one processor and at least one memory including computer program code,
  the at least one memory and the computer program code configured to, with the at least one processor, cause the apparatus to perform at least the following:
    based on at least one utterance of a pass-phrase and predetermined scoring information comprising predetermined linguistic-element-scores attributable to one or more linguistic elements that form at least part of each of the at least one utterance,
  provide for spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold.

11 Claims, 1 Drawing Sheet

(51) Int. Cl.
*G10L 15/06* (2013.01)
*G10L 17/24* (2013.01)
*G10L 25/51* (2013.01)
G10L 15/14 (2006.01)
G10L 15/16 (2006.01)
G10L 15/187 (2013.01)

(52) U.S. Cl.
CPC ............ *G10L 25/51* (2013.01); *G10L 15/142* (2013.01); *G10L 15/16* (2013.01); *G10L 15/187* (2013.01)

(58) Field of Classification Search
USPC .................... 704/251, 273, 276, E21.001
See application file for complete search history.

(56) References Cited

U.S. PATENT DOCUMENTS

| | | | | |
|---|---|---|---|---|
| 8,097,420 | B1* | 1/2012 | Doyle | G01N 33/6893 435/7.1 |
| 8,099,288 | B2 | 1/2012 | Zhang et al. | |
| 8,625,796 | B1* | 1/2014 | Ben Ayed | H04L 63/0853 380/258 |
| 2005/0089824 | A1* | 4/2005 | Asakawa | G09B 21/006 434/112 |
| 2005/0171851 | A1* | 8/2005 | Applebaum | G06F 21/32 705/18 |
| 2006/0190735 | A1* | 8/2006 | May | G06F 21/32 713/182 |
| 2012/0130714 | A1 | 5/2012 | Zeljkovic et al. | |
| 2013/0073336 | A1* | 3/2013 | Heath | G06Q 30/02 705/7.29 |
| 2013/0084976 | A1* | 4/2013 | Kumaran | G06F 17/2845 463/30 |
| 2013/0151969 | A1* | 6/2013 | Campbell | G06F 16/748 715/720 |
| 2014/0012586 | A1* | 1/2014 | Rubin | G10L 25/51 704/273 |
| 2015/0161990 | A1* | 6/2015 | Sharifi | G10L 15/08 704/251 |
| 2015/0200715 | A1 | 8/2015 | Kim et al. | |
| 2018/0060557 | A1* | 3/2018 | Valenti | G10L 15/06 |
| 2018/0117056 | A1* | 5/2018 | Patchett | A61P 33/00 |

OTHER PUBLICATIONS

Larcher, Anthony et al; "The RSR2015: Database for Text-Dependent Speaker Verification using Multiple Pass-Phases"; Institute for Infocomm Research, A*Star, Singapore; 4 pages.

Larcher, Anthony et al; "Reinforced Temporal Structure Information for Embedded Utterance-Based Speaker Recognition"; retreived from the Internet https://pdfseaker Recognition.

Amino, Kanae et al; "Idiosyncrasy of nasal sounds in human speaker identification and their acoustic properties"; Acoust. Sci. & Tech. 27, 4; 3 pages (2006).

Anguity, Jan et al; "Word Confusability Prediction in Automatic Speech Recognition"; Proceeding of International Conference on Spoken Language; pp. 1489-1492 (Oct. 4, 2004); retreived on Oct. 7, 2013 from internet http://nlp.lsi.upc.edu/papers/anguita04.pdf.

Badran, Ehab F.M.F. et al; "Speaker Recognition Using Artificial Neural Networks Based on Vowel phonemes"; Proceedings of ISCP2000; IEEE; 7 pages (2000).

Fatima, Nakhat et al; "Vowel-Category based Short Utterance Speaker Recognition"; 2012 IEEE International Conference on Systems and Informatics ; 5 pages (2012).

Kahn, Juliette et al; "Inter and Intra-Speaker Variability in French: An Analysis of Oral Vowels and its implication for automatic speaker Verification"; ICPhS XVII, Regular Session, Hong Kong, Aug. 17-21, 2011; 4 pages (Aug. 2011).

Li, Lantian et al; "Improving Short Utterance Speaker Recognition by Modeling Speech Unit Classes"; IEEE/ACM Transactions on Audio, Speech, and Language Processing, vol. 24, No. 6; 11 pages (Jun. 2016).

Manikandan, J. et al; Implementation of a Novel Phoneme Recognition System using TMS320C6713 DSP; IEEE 23rd International Conference on VLSI Design; 6 pages (2010).

Roe, D B et al; "Prediction of Word Confusabilities for Speech Recognition"; International Conference on Spoken Language Processing, Yokohama, Japan, Sep. 18-22, 1994; vol. 1; pp. 227-230 (Sep. 18, 1994).

Zhang, Shi-Xiong et al; "Speaker Verification via High-Level Feature-Based Phonetic-Class Pronunciation Modeling"; IEEE Transactions on Computers, vol. 56, No. 9; 10 pages (Sep. 2007).

* cited by examiner

SPOKEN PASS-PHRASE SUITABILITY DETERMINATION

CROSS-REFERENCE TO RELATED APPLICATIONS

This application claims the priority under 35 U.S.C. § 119 of European patent application no. 16290162.3, filed Aug. 25, 2016 the contents of which are incorporated by reference herein.

The present disclosure relates to an apparatus for determining the suitability of a spoken pass-phrase. It also relates to an associated method and computer program for determining the same.

It may be desirable for a spoken pass-phrase to be strong, similar to a text based password.

According to a first aspect of the present disclosure there is provided an apparatus comprising at least one processor and at least one memory including computer program code, the at least one memory and the computer program code configured to, with the at least one processor, cause the apparatus to perform at least the following:

based on at least one utterance of a pass-phrase and predetermined scoring information comprising predetermined linguistic-element-scores attributable to one or more linguistic elements that form at least part of each of the at least one utterance, provide for spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold.

In one or more embodiments, the apparatus provides for control of a spoken pass-phrase enrolment procedure for providing a spoken pass-phrase for future authentication of a user, based on the suitability determination.

In one or more embodiments, the apparatus is configured to base said spoken pass-phrase suitability on at least two utterances of the pass-phrase and the pass-phrase suitability is also determined to be deficient based on a measure of spoken pass-phrase consistency comprising a difference between the at least two utterances being above a predetermined consistency threshold.

In one or more embodiments, the linguistic analysis comprises one or more of:

phonetic analysis, glottal voice source feature analysis, morpheme analysis, prosodic unit analysis, phonological analysis, syllable analysis, onset and rime analysis, articulatory features analysis and mora analysis.

In one or more embodiments, the linguistic elements comprise one or more of:

words, syllables, phonetic parts, prosodic units, patterns of two or more phonetic parts in the at least two utterances, patterns of two or more prosodic units in the at least two utterances.

In one or more embodiments, on determination that the pass-phrase suitability is deficient based on the pass-phrase score being below the predetermined pass-phrase score threshold, the apparatus is configured to provide for prompting of a user to change their pass-phrase.

In one or more embodiments, on determination that the pass-phrase suitability is deficient based on the difference between the at least two utterances being above a predetermined consistency threshold, the apparatus is configured to provide for prompting of a user to make one or more further utterances of the pass-phrase.

In one or more embodiments, the apparatus is configured to generate a pass-phrase model from the at least two utterances of the pass-phrase, the pass-phrase model comprising a statistical description of the utterances of the pass-phrase, wherein the measure of spoken pass-phrase consistency comprises a difference between the model and a corresponding statistical description of at least one of the at least two utterances.

In one or more embodiments, the measure of spoken pass-phrase consistency comprises a log-likelihood ratio.

In one or more embodiments, the pass-phrase model comprises one or more of: a hidden Markov based model, a Gaussian mixture model, i-Vector probabilistic linear discriminant analysis model and a neural network based model.

In one or more embodiments, the linguistic elements comprises phonemes and/or phones. In one or more embodiments, the apparatus is configured to provide for segmentation of the one, or each, utterance of the pass-phrase into a plurality of individual phonemes and/or phones, and wherein each of the plurality of phonemes and/or phones is assigned its linguistic-element-score in accordance with the predetermined scoring information, the pass-phrase score based on the linguistic-element-scores for the plurality of phonemes and/or phones.

In one or more embodiments, the pass-phrase suitability is also determined to be deficient based on an identification of insufficient linguistic elements that have a linguistic-element-score above a distinctiveness threshold using a minimum distinctiveness threshold.

In one or more embodiments, the apparatus is configured to provide for the spoken pass-phrase suitability determination as part of an enrolment procedure in which a user provides a spoken pass-phrase for future use to authenticate the identity of the user.

In one or more embodiments, the apparatus comprises at least part of: portable electronic device, a mobile phone, a Smartphone, a laptop computer, a desktop computer, a tablet computer, a personal digital assistant, a digital camera, a smartwatch, a non-portable electronic device, a monitor, a household appliance, a smart TV, a server, or a module/circuitry for one or more of the same.

According to a second aspect of the present disclosure there is provided a method comprising;

based on at least one utterance of a pass-phrase and predetermined scoring information comprising predetermined linguistic-element-scores attributable to one or more linguistic elements that form at least part of each of the at least one utterance, providing for spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold.

According to a third aspect of the present disclosure there is provided a computer readable medium comprising computer program code stored thereon, the computer readable medium and computer program code being configured to, when run on at least one processor having memory, perform at least the following:

based on at least one utterance of a pass-phrase and predetermined scoring information comprising predetermined linguistic-element-scores attributable to one or more linguistic elements that form at least part of each of the at least one utterance, providing for spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which:

FIG. 1 shows an apparatus 100 comprising memory 101, a processor 102, input 103 and output 104. In this embodiment only one processor and one memory are shown but it will be appreciated that other embodiments may utilise more than one processor and/or more than one memory (e.g. same or different processor/memory types).

Figure 1:
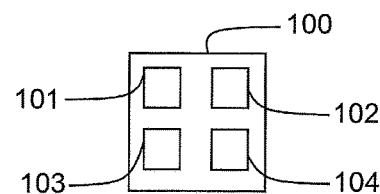
FIG. 1 shows an example embodiment of an apparatus.

In this embodiment the apparatus 100 is an Application Specific Integrated Circuit (ASIC) for a voice controlled (or at least voice authenticated) electronic device. In other embodiments the apparatus 100 can be a module for such a device, or may be the device itself, wherein the processor 102 may be a general purpose CPU of the device and the memory 101 may be general purpose memory comprised by the device. In other embodiments, the apparatus may be part of a voice control or voice authentication or voice authentication enrolment device. The functionality of the apparatus may be distributed over a plurality of processing devices, which may be remote from one another and in communication via a network or the like.

The input 103 allows for receipt of signalling to the apparatus 100 from further components, such as a microphone for receipt of one or more utterances or one or more other components configured to provide for pre-processing of utterances detected by a microphone and/or an input device such as a touch-sensitive or the like. The output 104 allows for onward provision of signalling from within the apparatus 100 to further components such as a display screen, a speaker or other components that require confirmation that a spoken pass-phrase is suitable for future use. In this embodiment the input 103 and output 104 are part of a connection bus that allows for connection of the apparatus 100 to further components.

The processor 102 is a processor dedicated to executing/processing information received via the input 103 in accordance with instructions stored in the form of computer program code on the memory 101. The output signalling generated by such operations from the processor 102 is provided onwards to further components via the output 104.

The memory 101 (not necessarily a single memory unit) is a computer readable medium (such as solid state memory, a hard drive, ROM, RAM, Flash or the like) that stores computer program code. This computer program code stores instructions that are executable by the processor 102, when the program code is run on the processor 102. The internal connections between the memory 101 and the processor 102 can be understood, in one or more example embodiments, to provide an active coupling between the processor 102 and the memory 101 to allow the processor 102 to access the computer program code stored on the memory 101.

In this example the input 103, output 104, processor 102 and memory 101 are all electrically connected to one another internally so as to be integrated together as a single chip that can be installed into an electronic device. In other examples one or more or all of the components may be located separately from one another.

The apparatus 100 is configured to provide for spoken pass-phrase suitability determination. The apparatus may be considered to determine the suitability based on an assessment of pass-phrase strength. The spoken pass-phrase may be user determined as opposed to a user saying a standard word or phrase provided to them and therefore determining whether or not the user's chosen spoken pass-phrase is suitable for control or authentication may be advantageous. In one or more examples, the apparatus 100 is configured to provide for biometric assessment of the spoken pass-phrase in determination of its suitability. In one or more examples, the apparatus 100 may be configured to be used as part of an enrolment procedure in which a user provides a spoken, user-determined, pass-phrase that forms the basis for future authentication of that user to access or operate a particular device or service. Thus, the apparatus 100 may be used for a telephone or online banking system during enrolment of the user to use that system in the future. In one or more examples, the apparatus 100 may be used by a smart TV to set up a spoken pass-phrase for authenticated access to particular settings, such as parental control settings. The apparatus 100 may be configured to provide feedback to a user who has provided a spoken pass-phrase on whether or not said spoken pass-phrase is suitable for future access or control. The suitability of a spoken pass-phrase may be based on one or more of: a measure of the distinctiveness of pass-phrase (such as how likely the same pass-phrase would be spoken or pronounced the same way by someone other than the user, which may be considered a biometric check)

and a measure of the consistency with which the user is able to articulate or pronounce the same pass-phrase (such as to ensure the chosen pass-phrase is reliably repeatable).

Figure 2:
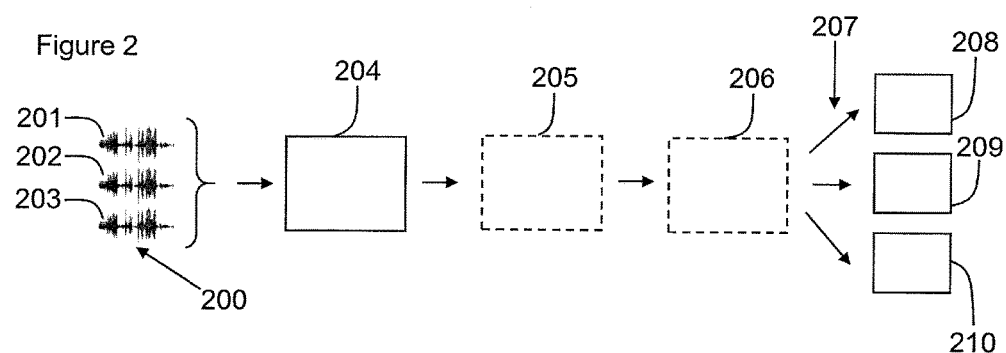
FIG. 2 shows an illustration of the functional parts of the apparatus.

FIG. 2 shows diagrammatically the functional elements of the apparatus 100. In particular, FIG. 2 shows the receipt 200 of at least one utterance of the same pass-phrase. In particular, in this example, the apparatus 100 is configured to receive three utterances of the same pass-phrase shown as 201, 202 and 203. It will be appreciated that the number of utterances may vary and may depend on how determination of whether or not the pass-phrase is suitable is implemented. For example, the apparatus may determine that the phrase is unsuitable based on the pass-phrase meeting any one of one or more criteria, as will be described below. Some of the criteria may require different numbers of utterances on which to determine the suitability.

The apparatus 100 may be configured to provide for analysis of the or each utterance by analysis of spoken linguistic features comprising features of language or component parts of language, such as phones or phonetics. A linguistic analysis component 204 provides for linguistic analysis of each of the three utterances 201-203. Accordingly, the determination of the suitability of the pass-phrase may be based on one or more linguistic characteristics thereof. The linguistic analysis component 204 may be provided with predetermined scoring information comprising predetermined linguistic-element-scores attributable to one or more linguistic elements. Thus, as the pass-phrase spoken in the utterances 201-203 is user-selected, the apparatus 100 may not be aware of which linguistic elements may be present. Accordingly, the predetermined scoring information may comprise a library of linguistic elements that may potentially be present in the spoken pass-phrase utterances 201-203. Nevertheless, the linguistic analysis may require that the predetermined scoring information contains linguistic elements that form at least part of the utterances 201-203. The predetermined scoring information may be stored in the memory 101 or may be stored remotely and accessed via a communication element (not shown).

The linguistic analysis component 204 may be configured to assign a pass-phrase-score to each utterance of the pass-phrase based on linguistic analysis. Accordingly, the linguistic analysis component may be configured to identify one or more linguistic elements in said utterances 201-203. With reference to the predetermined scoring information, the or each linguistic element is given a linguistic-element-score by, for example, look up of the linguistic element identified in the spoken pass-phrase in the predetermined scoring information. Certain linguistic elements may be given higher scores by the predetermined scoring information because their presence in the spoken pass-phrase is distinctive or the way the particular user says them is distinctive. Other linguistic elements may be given a lower score perhaps because they are undistinctive or the way the particular user says them is undistinctive.

The linguistic analysis component 204 may be configured to determine the pass-phrase score based on the one or more linguistic-element scores of the, identified, linguistic elements. For example, the pass-phrase score may be sum of the linguistic-element scores, a product of the linguistic element scores, a function of the linguistic element scores. For example, the pass-phrase score may be determined, at least in part, based on the number, pattern, and/or frequency of occurrence of one or more of the linguistic elements, different linguistic elements, linguistic elements that have a particular linguistic element score such as above a distinctiveness threshold, a group of two or more temporally adjacent linguistic elements, and a group of two or more linguistic elements appearing within a predetermined temporal distance of one another in the spoken pass-phrase.

For example, it may be provided for in the predetermined scoring information, that if a pattern of consecutive (or regular) phonemes and/or phones of a particular family of phonemes and/or phones is identified, and such a pattern is known to be very discriminative, then a high linguistic element score may be applied. In one or more examples, if the linguistic analysis component identified a certain prosody (relative variation of fundamental frequency and/or derivatives) and such a prosody is known to be very discriminative (maybe regardless of the component, non-discriminative phonemes that form it) then a high linguistic element score may be applied.

One or more linguistic elements that have a linguistic-element score below a particular distinctiveness threshold may be excluded from determination of the pass-phrase score. This may be advantageous as a spoken-pass-phrase having many low scoring linguistic elements may not be, overall, very distinctive. However, a shorter pass-phrase having a few high scoring linguistic elements may be more distinctive overall. In one or more examples, patterns of linguistic elements may be identified prior to setting the distinctiveness threshold, because it may be found that a particular pattern of undiscriminating linguistic element is, itself, discriminative of the user.

FIG. 2 further shows an optional model determination component 205 and an optional model analysis component 206, which will be described below.

The apparatus 100 is configured to provide for spoken pass-phrase suitability determination by assessment of the pass-phrase score at 207. The spoken pass-phrase suitability may be determined to be deficient at least based on the pass-phrase score being below a predetermined pass-phrase score threshold. This determination of unsuitability is shown as a first deficient pass-phrase action component 208. The first deficient pass-phrase action component 208 may provide for feedback to the user or another system (such as a system enrolling the user for a service) that the pass-phrase spoken by the user is unsuitable, as there may be a (too) high likelihood of the pass-phrase being spoken or pronounced the same way by someone else. The feedback may comprise a prompt to the user to choose a different pass-phrase.

The spoken pass-phrase suitability may be determined to be acceptable at least based on the pass-phrase score being equal to or above the predetermined pass-phrase score threshold. This determination of suitability is shown as acceptable pass-phrase action component 209. The component 209 may provide for feedback to the user or another system (such as a system enrolling the user for a service) that the pass-phrase spoken by the user is suitable. In one or more examples, the enrolment procedure may be continued or completed based on this determination.

The utterance of a pass-phrase may comprise at least one or more spoken words or syllables. In one or more examples, the utterance comprises at least two, three, four or five spoken words or syllables. In one or more examples, the duration of the utterance comprises at least 0.2, 0.4, 0.6, 0.8, 1.0, 1.25, 1.5 or at least 2.0 seconds. In one or more examples, the duration of the utterance comprises less than 10, 8, 6, 5, 4, 3 seconds.

The predetermined scoring information may be based on analysis of a large corpus of spoken words. The analysis may identify linguistic elements that have the widest range of pronunciation amongst a given set of speakers. Scores may be assigned empirically or based on a predetermined function to each linguistic element appearing in the predetermined scoring information. The predetermined scoring information may comprise a look-up table of linguistic elements and associated linguistic-element scores. The predetermined scoring information may comprise a function to assign linguistic elements an associated linguistic-element score based on one or more of: their presence in the utterance, their existence with other linguistic elements in the utterance and their existence immediately adjacent to other linguistic elements in the utterance (or within a temporal/linguistic element distance). The scoring of the linguistic elements compared to the counting of the quantity of linguistic elements may be advantageous, as the suitability of a pass-phrase may, in some examples, be better judged by the quality of its linguistic content rather than the quantity.

In one or more examples, the linguistic analysis may comprise phonetic analysis. Accordingly, the linguistic elements comprises phonemes and/or phones and the apparatus is configured to provide for segmentation of the one, or each, utterance of the pass-phrase into a plurality of individual phonemes or phones or groups of phonemes or phones. Those skilled in the art will recognize that techniques are known for parsing an utterance into phonemes. For example, J Manikandan et al "*Implementation of a Novel Phoneme Recognition System Using TMS320C6713 DSP,*" 2010, pp. 27-32 provides an example of such a technique. It will be appreciated that other phoneme parsing/labelling techniques may be used. In this example, the predetermined scoring information comprises scoring for phonemes. For example, it is known from prior studies of speakers that particular phonemes are more distinctive than others, such as nasal vowels. Accordingly, the scores provided by the predetermined scoring information may be based on such studies. Each of the phonemes identified in the utterance can be assigned its linguistic-element-score in accordance with the predetermined scoring information. The utterance of the pass-phrase may then be provided with a pass-phrase score based on the scores given to the phonemes present therein. For example, the pass-phrase score may comprise a sum of the linguistic-element-scores for the plurality of phonemes, although other methods of combining the linguistic-element-scores may be used.

In one or more examples, the phonetic analysis may include modelling tri-phones and/or bi-phones such as by using hidden Markov models and the scoring is applied to the modelled linguistic (phonetic) elements.

The linguistic analysis component 204 may provide for splitting the utterance into a plurality of frames (i.e. temporal sub-sections), which may be overlapping (in time). The identification of phonemes, phones or other linguistic elements may be applied to the frames. This may provide for more efficient processing.

In one or more examples, as described above, the linguistic analysis may comprise phonetic analysis, but in one or more examples, other forms of linguistic analysis may be performed. For example, the method may comprise identifying prosodic units in the utterance and the assignment of linguistic-element scores to each of the identified prosodic units perhaps using the look-up table or function technique above. The prosodic analysis may be provided in terms of $f_0$ dynamics.

In one or more examples, and as described above, the linguistic analysis may comprise one or more of phonetic analysis, glottal voice source feature analysis, morpheme analysis, prosodic unit analysis, phonological analysis, syllable analysis, onset and rime analysis, articulatory features analysis and/or mora analysis. Accordingly, the linguistic element may comprise the subject of each type of analysis. One or more types of linguistic analysis may be performed and the pass-phrase score may be a combination of different linguistic-element scores based on the different types of linguistic analysis.

For glottal voice source feature analysis, the apparatus may be configured identify the occurrence of and/or patterns in and/or form of glottal sounds in the one or more utterances. The use of glottal analysis may be advantageous as it has been found that glottal sounds may contain information about the state of the vocal tract, which may be useful for an anti-spoofing check.

In addition to any of the above linguistic analysis techniques or combinations of linguistic analysis, the apparatus may or may not be configured to base the determination of the suitability of the utterance of the pass-phrase on audio features of the utterances. Accordingly, changes in or rates of change in amplitude or frequency or changes in rates of change may be determined and used together with the linguistic analysis to score the pass-phrase. In one or more examples, the audio features may include one or more of frequency fading, cut-off (in terms of time or frequency), static noise cause by deterioration of the microphone and/or ambient noise) or something suspect (for example, every component has the same phase, which may be indicative of the utterance being generated by a voice synthesiser, such as used in a spoofing attack.

In one or more examples, the linguistic analysis may be applied to the whole utterance rather than identifying sub-elements thereof. Accordingly, the linguistic element may comprises the whole pass-phrase uttered by the user. The predetermined scoring information may provide information for scoring the utterance, such as based on patterns (e.g. linguistic patterns) identified therein rather than individual component parts.

The linguistic analysis component 204 may be configured to identify patterns in one or more audio features of one or more of the linguistic elements. The audio features may comprise one or more of: volume, tone or changes therein. For example, an audio feature of an identified linguistic feature may be identified that better characterizes how the user said that phoneme. For example, pitch variation or the formant distances or the fact that said phoneme, with particular spectral components, occurs after a sequences of nasal and vowels phonemes and/or at a particular volume and/or held for at least a particular time may be a good discriminator. The same may be applied for phones rather than or in additional to the phonemes described above.

In one or more examples, where the apparatus 100 is configured to base said spoken pass-phrase suitability on at least two utterances of the pass-phrase, the suitability of the spoken pass-phrase may also be judged based on how consistently the user spoke the same pass-phrase during the at least two utterances. Thus, the failure to reach a pass-phrase score threshold may comprise a first criteria for declaring the pass-phrase unsuitable and the consistency across utterances of the spoken pass-phrase may be a second criteria. It will be appreciated that the reason for a difference in pronunciation between two or more utterances 201, 202, 203 of the same pass-phrase may be due to a mistake by the user, or background noise or because the chosen pass-phrase is simply difficult for that user to articulate consistently. Accordingly, the failure of this consistency criteria may cause the apparatus 100 to provide for feedback, as diagrammatically shown as inconsistent utterance action component 210. The feedback to the user may be an instruction to them to provide one or more further utterances of the same pass-phase. The consistency may be re-evaluated based on the one or more additional utterances. If the utterances are still not consistent, this may cause the apparatus 100 to provide for feedback to the user instructing them to choose a different pass-phrase and provide utterances of that different pass-phrase. The feedback provided by the inconsistent utterance action component 210 may be to a further device, such as one performing a user enrolment procedure.

The apparatus 100 may provide for measuring of a spoken pass-phrase consistency of the utterances. To evaluate the spoken pass-phrase consistency a difference between at least two utterances 201, 202 or 202, 203 or 201, 203 may be compared to a predetermined consistency threshold. A correlation function may be used to determine the difference such as the determination of the correlation coefficient. In one or more examples, the utterances may be processed to provide for one or more of removal of any silence or noise at the beginning and/or end and/or during the utterance; noise removal; non-voice noise removal; scaling of the duration within bounds; and aligning the at least two utterances in time. A comparison between the utterances may then be made. This processing may be performed independent of the spoken pass-phrase consistency evaluation, such as prior to assignment of linguistic-element scores.

In one or more examples, a different method for evaluating consistency may be used, such as based on the consistent identification of the same linguistic elements (e.g. phonemes) at the same temporal locations in the utterance (or within a threshold distance of the same temporal location).

The evaluation of the consistency of the utterances may be based on a comparison between one of the utterances and a model comprising a statistical description of both or all the utterances.

The model determination component 205 provides for generation of a model that characterizes the plurality of utterances (such as in combination or individually) in terms of a statistical description of the linguistic content. Thus, in one or more examples, the statistical description may define the utterance in terms of temporal positioning of phonetic or prosodic content or patterns thereof. As shown in FIG. 2, the model may include one or more parts of the data representing audio of the utterances 201, 202, 203.

The model may be a hidden Markov model or a Gaussian mixture model of the utterances 201, 202, 203. The model may be generated using a maximum a posteriori (MAP) estimation technique, although other model generation techniques may be used, such as like i-Vector probabilistic linear discriminant analysis (PLDA). The input to the model determination component 205 may comprise the utterances 201, 202, 203 or processed versions thereof (as mentioned above and in terms of framed sub-sections). Further, the results of the linguistic analysis component 204 may provide for generation of the model. Thus, the labelling of the linguistic elements in the utterance and/or the score applied to the linguistic elements may be provided for generation of the model. The modelling of utterances using hidden Markov model or a Gaussian mixture model will be familiar to those skilled in the art.

The linguistic analysis component 204 may provide for pruning (i.e. removal) of linguistic components that score below a minimum distinctiveness threshold. Thus, linguistic components that do not contribute (much) to the distinctiveness of the utterance may be removed from further consideration. Thus, in one or more examples, the input to the model determination component 205 may comprise the utterance with indistinctive linguistic content removed therefrom.

The suitability of the pass-phrase may further by evaluated based on one or more of the temporal length or a function of the temporal length and scores applied to remaining linguistic elements once the linguistic components that score below a minimum distinctiveness threshold are removed. Thus, the apparatus 100 may require the "pruned" utterance to be above a minimum length of, for example, 1 second. In one or more examples, the apparatus may define different temporal lengths based on the linguistic element scores. Thus, for example, a high scoring spoken pass-phrase may be allowed to be shorter in temporal length than a lower scoring spoken pass-phrase. If this process determines the pass phrase not to be suitable, the apparatus may provide for the feedback provided by deficient pass-phrase action component 208.

The model created by the model determination component 205 may, if the pass-phrase is determined to be suitable by the apparatus 100, forms the description of the utterance of the pass-phrase upon which future utterances of the pass-phrase are compared against to authenticate the user or provide for particular control of device.

The optional model analysis component 206 may provide for analysis of the suitability of the pass-phrase. As mentioned above, the evaluation of the consistency of the utterances may be based on a comparison between one of the utterances and the model generated by the model determination component 205. In one or more examples, the model is created from a combination of the at least two utterances (in this example three utterances 201, 202, 203). In the evaluation of consistency, the apparatus 100 takes one or each of the utterances and compares a statistical description of the individual utterance with the (same) statistical description used by the model. The comparison may comprise determination of a log-likelihood ratio which is compared to the consistency threshold. In this case the log-likelihood ratio will be between the log-likelihood of the generated model and a Universal Background Model (UBM). The UBM comprises a model representative of speaker-independent spoken feature characteristics. The UBM may be gender dependent. N scores may be obtained that correspond to the N pass phrase utterances: in each case, two terms of the log-likelihood ratio depend on the distance between the utterance (its feature vector) and the generated model from the utterances versus the distance between the utterance (its feature vector) and the UBM. Then, the distance between those N scores gives a measure of compactness of the model.

In the above examples, the apparatus 100 is described as performing the functionality described. However, it will be appreciated that the apparatus may provide, through signalling sent to other components, for the functionality to be performed by those other components. Accordingly, the apparatus 100 may manage the functionality provided by other components or may perform that functionality itself or a combination of the two. For example, the apparatus may provide signalling to a linguistic element identifier in order to identify linguistic elements. The linguistic element identifier may provide the results back to the apparatus. For example, the apparatus may provide signalling to a linguistic element scorer for scoring the linguistic elements, the results being fed back to the apparatus 100. For example, the apparatus may provide signalling to a model generator for performing the function of the model determination component 205, the results being fed back to the apparatus 100.

For example, the apparatus may provide signalling to a model analyser for performing the function of the model analysis component 206, the results being fed back to the apparatus 100.

Figure 3:
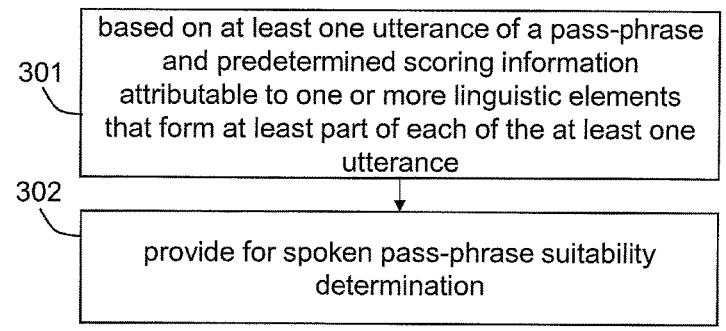
FIG. 3 shows a flowchart illustrating a method.

FIG. 3 shows a flow chart illustrating the steps of based on 301 at least one utterance of a pass-phrase and predetermined scoring information comprising predetermined linguistic-element-scores attributable to one or more linguistic elements that form at least part of each of the at least one utterance; providing for 302 spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold.

Figure 4:
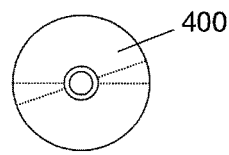
FIG. 4 illustrates a computer readable medium.

FIG. 4 illustrates schematically a computer/processor readable medium 400 providing a program according to an example. In this example, the computer/processor readable medium is a disc such as a digital versatile disc (DVD) or a compact disc (CD). In other examples, the computer readable medium may be any medium that has been programmed in such a way as to carry out a defined function. The computer program code may be distributed between multiple memories of the same type, or multiple memories of a different type, such as ROM, RAM, flash, hard disk, solid state, etc.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising at least one processor and at least one memory including computer program code,
   the at least one memory and the computer program code configured to, with the at least one processor, cause the apparatus to perform at least the following:
   based on at least one utterance of a pass-phrase and predetermined scoring information comprising predetermined linguistic-element-scores attributable to one or more linguistic elements that form at least part of each of the at least one utterance,
   provide for spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold;
   wherein the apparatus is configured to base said spoken pass-phrase suitability on at least two utterances of the pass-phrase and the pass-phrase suitability is also determined to be deficient based on a measure of spoken pass-phrase consistency comprising a difference between the at least two utterances being above a predetermined consistency threshold and wherein the apparatus is configured to generate a pass-phrase model from the at least two utterances of the pass-phrase, the pass-phrase model comprising a statistical description of the utterances of the pass-phrase, wherein the measure of spoken pass-phrase consistency comprises a difference between the model and a corresponding statistical description of at least one of the at least two utterances;
   wherein the apparatus is configured to provide for the spoken pass-phrase suitability determination as part of an enrolment procedure in which a user provides a spoken pass-phrase to a microphone of the apparatus for future use to authenticate the identity of the user;

wherein the apparatus comprises at least part of: a portable electronic device, a mobile phone, a Smartphone, a laptop computer, a desktop computer, a tablet computer, a personal digital assistant, a digital camera, a smartwatch, a non-portable electronic device, a monitor, a household appliance, a smart TV, a server, or a module/circuitry for one or more of the same.

2. The apparatus of claim 1, wherein the linguistic analysis comprises one or more of:

phonetic analysis, glottal voice source feature analysis, morpheme analysis, prosodic unit analysis, phonological analysis, syllable analysis, onset and rime analysis, articulatory features analysis and mora analysis.

3. The apparatus of claim 1, wherein the linguistic elements comprise one or more of:

words, syllables, phonetic parts, prosodic units, patterns of two or more phonetic parts in the at least two utterances, patterns of two or more prosodic units in the at least two utterances.

4. The apparatus of claim 1, wherein on determination that the pass-phrase suitability is deficient based on the pass-phrase score being below the predetermined pass-phrase score threshold, the apparatus is configured to provide for prompting of a user to change their pass-phrase.

5. The apparatus of claim 1, wherein on determination that the pass-phrase suitability is deficient based on the difference between the at least two utterances being above a predetermined consistency threshold, the apparatus is configured to provide for prompting of a user to make one or more further utterances of the pass-phrase.

6. The apparatus of claim 1, in which the measure of spoken pass-phrase consistency comprises a log-likelihood ratio.

7. The apparatus of claim 1, wherein the pass-phrase model comprises one or more of: a hidden Markov based model, a Gaussian mixture model, i-Vector probabilistic linear discriminant analysis model and a neural network based model.

8. The apparatus of claim 1, wherein the linguistic elements comprises phonemes and/or phones and the apparatus is configured to provide for segmentation of the one, or each, utterance of the pass-phrase into a plurality of individual phonemes and/or phones, and wherein each of the plurality of phonemes and/or phones is assigned its linguistic-element-score in accordance with the predetermined scoring information, the pass-phrase score based on the linguistic-element-scores for the plurality of phonemes and/or phones.

9. The apparatus of claim 8, wherein and the pass-phrase suitability is also determined to be deficient based on an identification of insufficient linguistic elements that have a linguistic-element-score above a distinctiveness threshold using a minimum distinctiveness threshold.

10. A method of operating an apparatus comprising;

based on at least one utterance of a pass-phrase and predetermined scoring information comprising predetermined linguistic-element-scores attributable to one or more linguistic elements that form at least part of each of the at least one utterance, providing for spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold;

the method further comprising;

basing said spoken pass-phrase suitability on at least two utterances of the pass-phrase and determining that the pass-phrase suitability is deficient based on a measure of spoken pass-phrase consistency comprising a difference between the at least two utterances being above a predetermined consistency threshold and generating a pass-phrase model from the at least two utterances of the pass-phrase, the pass-phrase model comprising a statistical description of the utterances of the pass-phrase, wherein the measure of spoken pass-phrase consistency comprises a difference between the model and a corresponding statistical description of at least one of the at least two utterances;

providing the spoken pass-phrase suitability determination as part of an enrolment procedure in which a user provides a spoken pass-phrase to a microphone of the apparatus for future use to authenticate the identity of the user;

wherein the apparatus comprises at least part of: a portable electronic device, a mobile phone, a Smartphone, a laptop computer, a desktop computer, a tablet computer, a personal digital assistant, a digital camera, a smartwatch, a non-portable electronic device, a monitor, a household appliance, a smart TV, a server, or a module/circuitry for one or more of the same.

11. A non-transitory computer readable medium comprising computer program code stored thereon, the computer readable medium and computer program code being configured to, when run on at least one processor having memory, perform at least the following:

based on at least one utterance of a pass-phrase and predetermined scoring information comprising predetermined linguistic-element-scores attributable to one or more linguistic elements that form at least part of each of the at least one utterance, providing for spoken pass-phrase suitability determination wherein the at least one utterance is assigned a pass-phrase-score based on linguistic analysis in which one or more linguistic elements identified in said utterances are assigned their corresponding linguistic-element-score from the predetermined scoring information, the pass-phrase score based on the one or more linguistic-element scores of the, identified, linguistic elements, wherein the spoken pass-phrase suitability is determined to be deficient at least based on the pass-phrase score being below a predetermined pass-phrase score threshold;

basing said spoken pass-phrase suitability on at least two utterances of the pass-phrase and determining that the pass-phrase suitability is deficient based on a measure of spoken pass-phrase consistency comprising a difference between the at least two utterances being above a predetermined consistency threshold and generating a pass-phrase model from the at least two utterances of the pass-phrase, the pass-phrase model comprising a statistical description of the utterances of the pass-phrase, wherein the measure of spoken pass-phrase consistency comprises a difference between the model and a corresponding statistical description of at least one of the at least two utterances;

providing the spoken pass-phrase suitability determination as part of an enrolment procedure in which a user provides a spoken pass-phrase to a microphone of an apparatus for future use to authenticate the identity of the user;

wherein the apparatus comprises at least part of: a portable electronic device, a mobile phone, a Smartphone, a laptop computer, a desktop computer, a tablet computer, a personal digital assistant, a digital camera, a smartwatch, a non-portable electronic device, a monitor, a household appliance, a smart TV, a server, or a module/circuitry for one or more of the same.

* * * * *